United States Patent [19]

Frierson

[11] Patent Number: 5,841,858
[45] Date of Patent: Nov. 24, 1998

[54] PHONE HANDSET HOUSING ASSEMBLY

[76] Inventor: William C. Frierson, 1550 Sagamore Dr., NE., Atlanta, Ga. 30345-4182

[21] Appl. No.: 858,608

[22] Filed: May 19, 1997

[51] Int. Cl.$^6$ .................................................... H04M 1/00
[52] U.S. Cl. .......................... 379/430; 379/433; 379/428
[58] Field of Search .................................... 379/430, 449, 379/434, 433, 428, 429, 454; 381/183, 187

[56] References Cited

U.S. PATENT DOCUMENTS

| | | | |
|---|---|---|---|
| 2,676,213 | 4/1954 | Anderson | 179/156 |
| 4,881,256 | 11/1989 | Malekos | 379/449 |
| 5,003,589 | 3/1991 | Chen | 379/430 |
| 5,177,784 | 1/1993 | Hu et al. | 379/430 |
| 5,233,650 | 8/1993 | Chan | 379/430 |
| 5,388,155 | 2/1995 | Smith | 379/446 |

*Primary Examiner*—Jack Chiang
*Attorney, Agent, or Firm*—Joseph N. Breaux

[57] ABSTRACT

A phone handset housing assembly that includes an upper and a lower handset housing unit that are interconnected by a resilient over-the-head combined support band/communications conduit, the upper and lower handset housing units being configurable in hand-held configuration for use in a hand-held mode wherein the upper and lower handset housing units are rigidly attached and the resilient over-the-head combined support band/communications conduit is stored within an upper and a lower band storage chamber formed, respectively within the upper and lower handset housing units, and configurable in a head-set configuration for use in a hand-less mode wherein the upper and lower handset housing units are separated and the resilient over-the-head combined support band/communications conduit is used to support the upper and lower handset housing units on either side of the user's head and against the user's ears; the lower handset housing unit including an extendable microphone support structure, a fixed microphone opening, and a lower handset housing unit earpiece opening; the upper handset housing unit including an upper handset housing unit top earpiece opening and an upper handset housing unit bottom earpiece opening.

20 Claims, 4 Drawing Sheets

PHONE HANDSET HOUSING ASSEMBLY

TECHNICAL FIELD

The present invention relates to handset housings for telephones and more particularly to a handset housing assembly for a telephone that includes an upper and a lower handset housing unit and a resilient over-the-head combined support band/communications conduit, each upper and lower handset housing unit having a circuit compartment formed therein for housing telephone handset circuitry and components, the upper and lower handset housing units being interconnected by the resilient over-the-head combined support band/communications conduit, the upper and lower handset housing units being configurable in hand-held configuration for use in a hand-held mode and in a head-set configuration for use in a hand-less mode; in the hand-held configuration the upper and lower handset housing units are rigidly attached by a connecting assembly including at least one securing pin and at least one securing sockets and the resilient over-the-head combined support band/communications conduit is stored within an upper and a lower band storage chamber formed, respectively, within the upper and lower handset housing units, and in the head-set configuration the upper and lower handset housing units are positioned away from each other and connected by the resilient over-the-head combined support band/communications conduit, the resilient over-the-head combined support band/communications conduit resiliently assuming a curved U-shape that is sufficient for use in supporting the upper and lower handset housing units on either side of the user's head and against the user's ears; the lower handset housing unit including an extendable microphone support structure, a fixed microphone opening, and a lower handset housing unit earpiece opening; the upper handset housing unit including an upper handset housing unit top earpiece opening and an upper handset housing unit bottom earpiece opening.

BACKGROUND OF THE INVENTION

Cordless telephone handsets are convenient and less restrictive to use than conventional wire connected telephone handsets. Although cordless telephone handsets are convenient, they can often restrict the user in that they must be held against the side of the user's head during use. It would be a benefit, therefore, to have a cordless telephone handset housing that included a mechanism for supporting the handset housing in an operational position with respect to the user's mouth and ears. Because it is often desirable to use a cordless telephone headset in a conventional hand-held mode, it would be a further benefit to have a telephone handset housing that could be configured in both a hand-held mode and in a head-set mode.

SUMMARY OF THE INVENTION

It is thus an object of the invention to provide a phone handset housing assembly that includes a mechanism for supporting the handset housing in an operational position with respect to the user's mouth and ears.

It is a further object of the invention to provide a phone handset housing assembly that is configurable in both a hand-held configuration for use in a hand-held mode and in a head-set configuration for use in a head-set mode.

It is a still further object of the invention to provide a phone handset housing assembly that includes an upper and a lower handset housing unit that are interconnected by a resilient over-the-head combined support band/communications conduit, the upper and lower handset housing units being configurable in hand-held configuration for use in a hand-held mode wherein the upper and lower handset housing units are rigidly attached and the resilient over-the-head combined support band/communications conduit is stored within an upper and a lower band storage chamber formed, respectively within the upper and lower handset housing units, and configurable in a head-set configuration for use in a hand-less mode wherein the upper and lower handset housing units are separated and the resilient over-the-head combined support band/communications conduit is used to support the upper and lower handset housing units on either side of the user's head and against the user's ears; the lower handset housing unit including an extendable microphone support structure, a fixed microphone opening, and a lower handset housing unit earpiece opening; the upper handset housing unit including an upper handset housing unit top earpiece opening and an upper handset housing unit bottom earpiece opening.

It is a still further object of the invention to provide a phone handset housing assembly that accomplishes some or all of the above objects in combination.

Accordingly, a phone handset housing assembly is provided. The phone handset housing assembly includes an upper and a lower handset housing unit that are interconnected by a resilient over-the-head combined support band/communications conduit, the upper and lower handset housing units being configurable in hand-held configuration for use in a hand-held mode wherein the upper and lower handset housing units are rigidly attached and the resilient over-the-head combined support band/communications conduit is stored within an upper and a lower band storage chamber formed, respectively within the upper and lower handset housing units, and configurable in a head-set configuration for use in a hand-less mode wherein the upper and lower handset housing units are separated and the resilient over-the-head combined support band/communications conduit is used to support the upper and lower handset housing units on either side of the user's head and against the user's ears; the lower handset housing unit including an extendable microphone support structure, a fixed microphone opening, and a lower handset housing unit earpiece opening; the upper handset housing unit including an upper handset housing unit top earpiece opening and an upper handset housing unit bottom earpiece opening.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
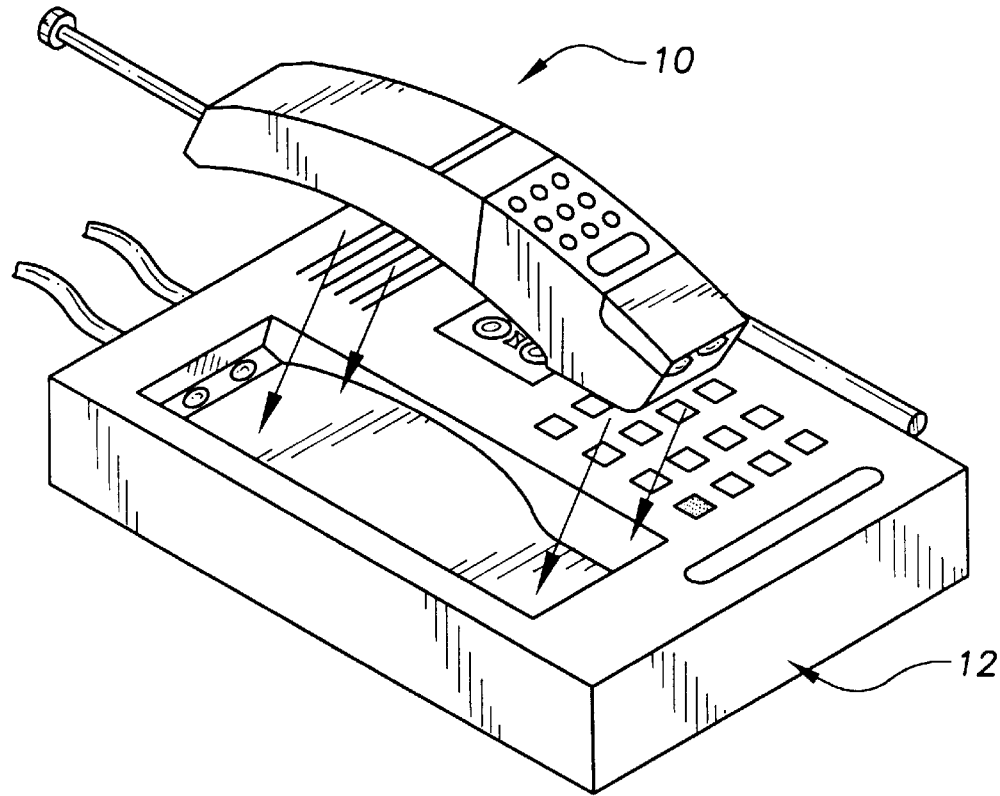
FIG. 1 is a perspective view of an exemplary embodiment of the phone handset housing assembly of the present invention along with a representative compatible phone base unit.
Figure 2:
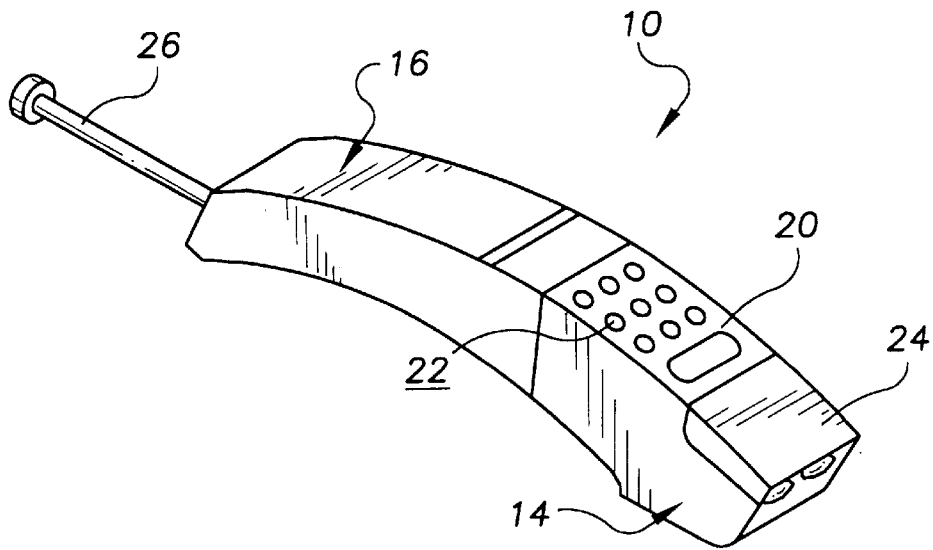
FIG. 2 is a perspective view of the exemplary phone handset housing assembly of FIG. 1 in isolation showing the dialing pad and the battery compartment cover provided on the back of the lower handset housing unit and the telescoping antenna extending from the upper handset housing unit.

FIG. 1 shows an exemplary embodiment of the phone handset housing assembly of the present invention generally designated by the numeral 10, exploded away from a representative compatible phone base unit, generally designated by the numeral 12. With reference to FIG. 2, phone handset housing assembly 10 includes a lower handset housing unit, generally designated 14; an upper handset housing unit, generally designated 16; and a resilient over-the-head combined support band/communications conduit, generally designated 18 (shown in FIGS. 3, 6 and 7). In this embodiment lower handset housing unit 14 and upper handset housing unit 16 are each molded from lightweight ABS plastic. An outwardly facing surface 20 of lower handset housing unit 14 has twelve key apertures 22 formed therethrough and a battery compartment access cover 24. A telescoping main antenna 26 is provided in upper handset housing unit 16.

Figure 3:
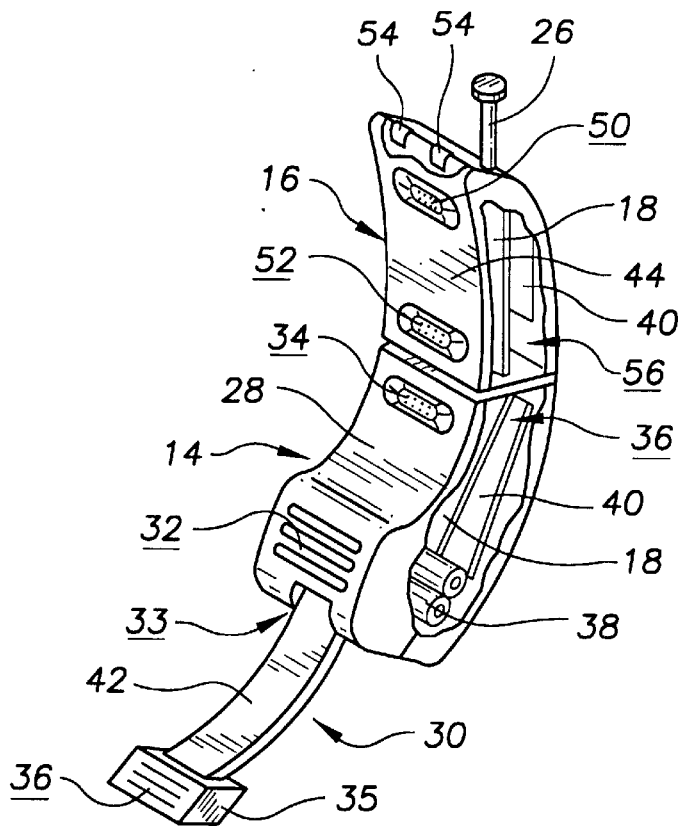
FIG. 3 is a perspective view of the inner facing side of the exemplary phone handset housing assembly of FIG. 2 showing the extendable microphone support structure, the fixed microphone opening, the lower handset housing unit earpiece opening, and the battery compartment within the lower handset housing unit; and the upper handset housing unit top and bottom earpiece openings, the battery charging contacts, and the extendable antenna of the upper handset housing unit.

With reference now to FIG. 3, an inner facing side 28 of lower handset housing unit 14 includes an extendable, molded plastic, microphone support structure, generally designated 30; a storage notch 33 for receiving a microphone pickup structure 35 having a number of microphone pickup openings 36; five, spaced, fixed position microphone openings 32; and a lower handset housing unit earpiece opening 34. The interior of lower handset housing unit 14 includes a combined lower unit chamber 36 sized for receiving handset batteries 38, handset operational components 40, a support conduit 42 of microphone support structure 30, and a first section of resilient over-the-head combined support band/communications conduit 18. The term "handset operational components" is used herein to mean conventional electrical and mechanical components found in telephone handsets, cordless or otherwise.

Support conduit 42 and microphone pickup structure 35 are integrally molded of lightweight ABS plastic. Support conduit 42 is slidable into and out of combined lower unit chamber 36. The first section of resilient over-the-head combined support band/communications conduit 18 is also slidable into and out of combined lower unit chamber 36.

An inner facing side 44 of upper handset housing unit 16 includes upper handset housing unit top and bottom earpiece openings 50, 52, and two battery charger contacts 54. The interior of upper handset housing unit 16 includes a combined upper unit chamber 56 sized for receiving a portion of main antenna 26, handset operational components 40, and a second section of resilient over-the-head combined support band/communications conduit 18. The second section of resilient over-the-head combined support band/communications conduit 18 is slidable into and out of combined upper unit chamber 56.

Figure 4:
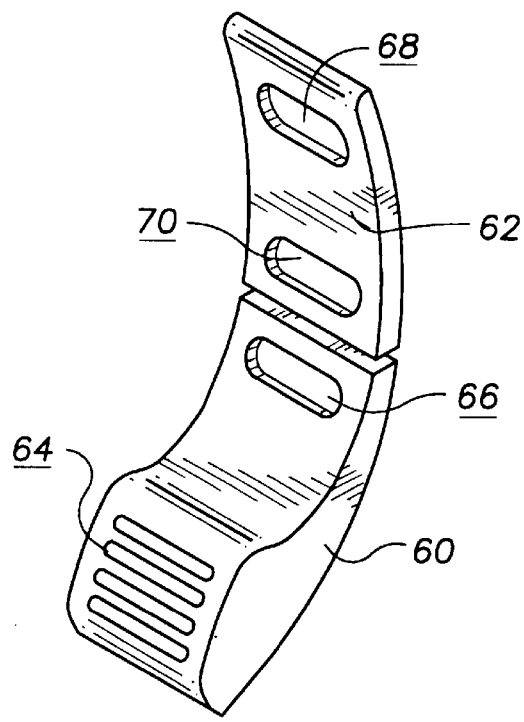
FIG. 4 is a perspective view of an exemplary embodiments of the optional adhesive backed foam rubber, upper and lower handset housing unit cushions showing the access apertures for the fixed microphone opening and the lower handset housing unit earpiece opening of the lower handset housing unit; and the access apertures for the upper handset housing unit top and bottom earpiece openings.

With reference to FIG. 4, in this embodiment phone handset housing assembly 10 (FIG. 2) is provided with optional upper and lower handset housing unit cushions 60, 62. Each upper and lower handset housing unit cushion 60, 62 is formed from resilient foam rubber and is adhesive backed.

Lower handset housing unit cushion 60 has five spaced fixed microphone access openings 64 and a lower handset housing unit earpiece access opening 66. Spaced, fixed microphone access openings 64 and lower handset housing unit earpiece access opening 66 are positioned into registration over spaced, fixed position microphone openings 32 (FIG. 3) and lower handset housing unit earpiece opening 34 (FIG. 3) when lower handset housing unit cushion 60 is secured to lower handset housing unit 14 (FIG. 3).

Upper handset housing unit cushion 62 has upper handset housing unit top and bottom earpiece access apertures 68, 70 for upper handset housing unit top and bottom earpiece openings 50, 52 (FIG. 3). Upper handset housing unit top and bottom earpiece access apertures 68, 70 are positioned into registration over upper handset housing unit top and bottom earpiece openings 50, 52 when upper handset housing unit cushion 62 is secured to upper handset housing unit 16 (FIG. 3).

Figure 5:
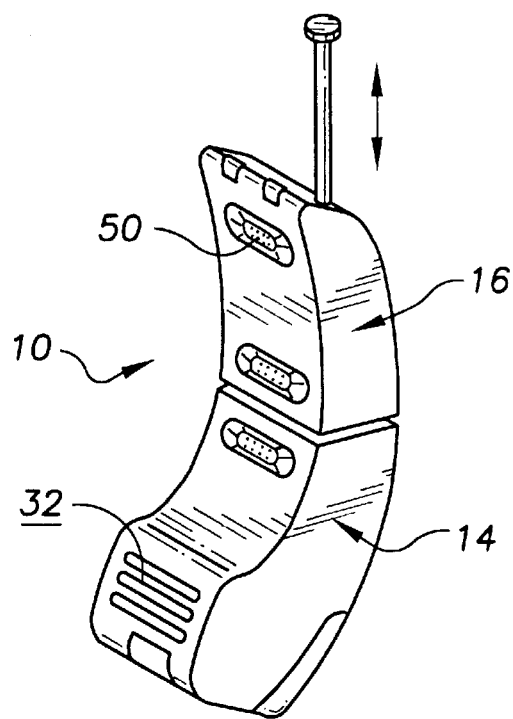
FIG. 5 is a perspective view of the inner facing side of the exemplary phone handset housing assembly of FIG. 3 showing the extendable microphone support structure positioned into the lower handset housing unit and the lower handset housing unit and the upper handset housing unit secured together in the conventional hand-held use configuration.

Referring now to FIG. 5, phone handset housing assembly 10 is constructed to be configured in two configurations—a hand-held configuration, shown in the figure, for use in a hand-held mode and a head-set configuration (shown in FIG. 7) for use in a hand-less mode. In the hand-held configuration, lower handset housing unit 14 and upper handset housing unit 16 are rigidly attached and the user typically uses upper handset housing unit top earpiece opening 50 to listen and the five, spaced, fixed position microphone openings 32 to speak.

Figure 6:
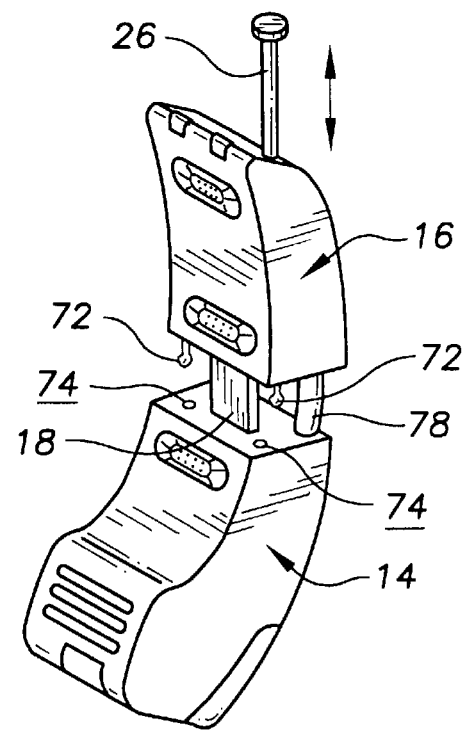
FIG. 6 is a perspective view of the inner facing side of the exemplary phone handset housing assembly of FIG. 5 showing the upper handset housing unit partially separated from the lower handset housing unit, the upper handset housing unit securing pins pulled free of the lower handset securing sockets; a portion of the resilient over-the-head combined support band/communications conduit extending between the upper and lower handset housing units; and the extendable primary antennae socket unit of the upper handset housing unit attached to the extendable secondary antenna of the lower handset housing unit.

Referring to FIG. 6, in this embodiment, lower handset housing unit 14 and upper handset housing unit 16 are rigidly held together by two upper handset housing unit securing pins 72 that snap fit into two companionate lower handset securing sockets 74. As lower handset housing unit 14 and upper handset housing unit 16 are pulled away from each other, first and second sections of resilient over-the-head combined support band/communications conduit 18 are withdrawn from combined lower unit chamber 36 (FIG. 3) and combined upper unit chamber 56 (FIG. 3) and telescoping main antenna 26 is disconnected from an extendable secondary antenna 78 of lower handset housing unit 14.

Figure 7:
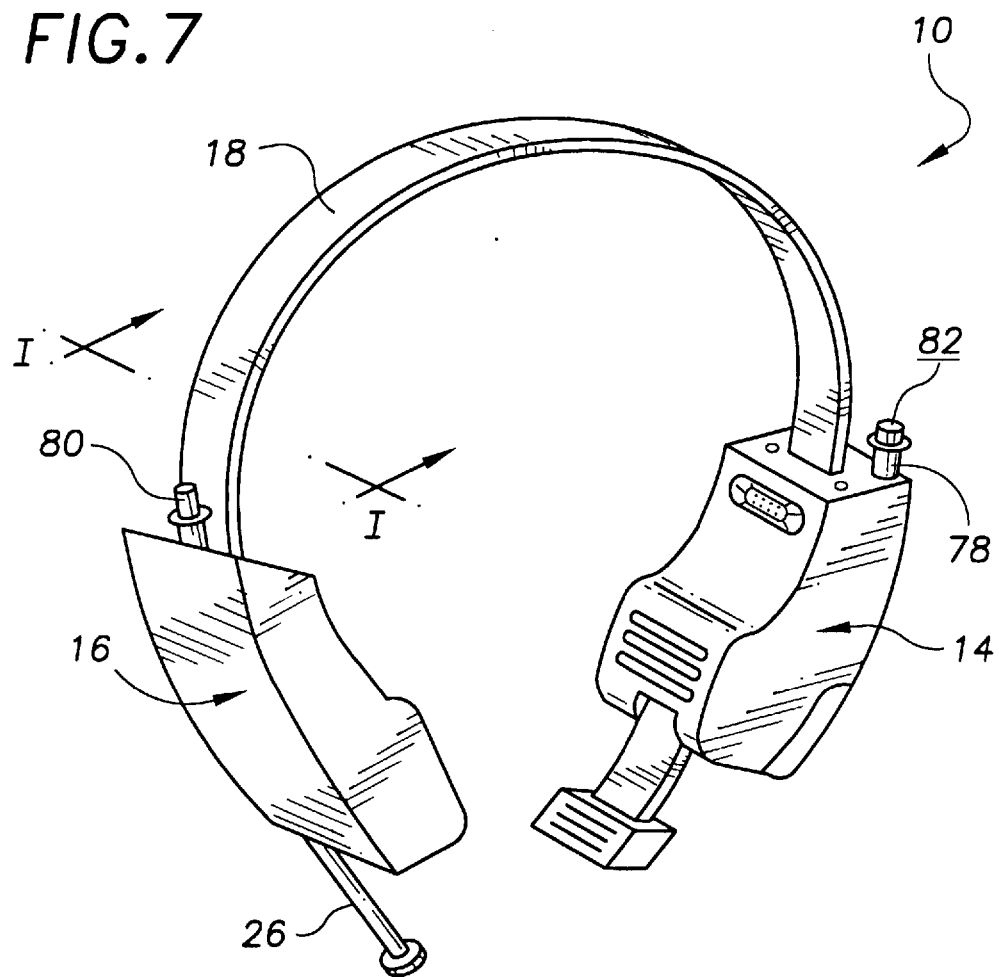
FIG. 7 is a perspective view of the exemplary phone handset housing assembly of FIG. 6 in the head-set configuration showing the upper handset housing unit fully separated from the lower handset housing unit, the resilient over-the-head combined support band/communications conduit fully extended between the upper and lower handset housing units; and the extendable primary antennae socket of the upper handset housing unit detached from the extendable secondary antenna of the lower handset housing unit.
Figure 7A:
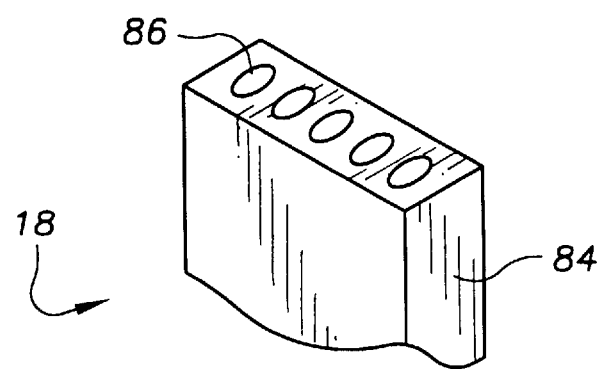
FIG. 7A is a cross-sectional perspective view of the resilient over-the-head combined support band/communications conduit along the line I—I of FIG. 7 showing the resilient plastic outer shell and the internal electrical cabling.

With reference now to FIG. 7, when phone handset housing assembly 10 is in the head-set configuration, upper handset housing unit 16 is fully separated from lower handset housing unit 14 and resilient over-the-head combined support band/communications conduit 18 is fully extended between upper and lower handset housing units 16, 14. When resilient over-the-head combined support band/communications conduit 18 is fully extended it assumes a curved U-shape that is sufficient for use in supporting upper and lower handset housing units 16, 14 on either side of a user's head and against a user's ears. In addition, when phone handset housing assembly 10 is in the head-set configuration, a connecting plug 80 of telescoping main antenna 26 is detached from a connecting socket 82 of secondary antenna of the lower handset housing unit. Referring to FIG. 7A, in this embodiment, resilient over-the-head combined support band/communications conduit 18 includes a resilient outer shell 84 that is constructed of resilient glass filled ABS plastic and that covers a number of copper electrical connecting cables 86 that can be used to interconnect operational components 40 if needed.

It can be seen from the preceding description that a phone handset housing assembly has been provided that includes a mechanism for supporting the handset housing in an operational position with respect to the user's mouth and ears; that is configurable in both a hand-held configuration for use in a hand-held mode and in a head-set configuration for use in a head-set mode; and that includes an upper and a lower handset housing unit that are interconnected by a resilient over-the-head combined support band/communications conduit, the upper and lower handset housing units being configurable in hand-held configuration for use in a hand-held mode wherein the upper and lower handset housing units are rigidly attached and the resilient over-the-head combined support band/communications conduit is stored within an upper and a lower band storage chamber formed, respectively within the upper and lower handset housing units, and configurable in a head-set configuration for use in a hand-less mode wherein the upper and lower handset housing units are separated and the resilient over-the-head combined support band/communications conduit is used to support the upper and lower handset housing units on either side of the user's head and against the user's ears; the lower handset housing unit including an extendable microphone support structure, a fixed microphone opening, and a lower handset housing unit earpiece opening; the upper handset housing unit including an upper handset housing unit top earpiece opening and an upper handset housing unit bottom earpiece opening.

It is noted that the embodiment of the phone handset housing assembly described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A phone handset housing assembly comprising:

an upper handset housing unit;

a lower handset housing unit; and a resilient over-the-head combined support band/communications conduit interconnected between said upper handset housing unit and said lower handset housing unit;

each of said upper and lower handset housing units having a circuit compartment formed therein for housing telephone handset operational components;

said upper and lower handset housing units being configurable in hand-held configuration for use in a hand-held mode and in a head-set configuration for use in a hand-less mode;

said upper and lower handset housing units being rigidly attached by a connecting assembly including at least one securing pin and at least one securing socket and said resilient over-the-head combined support band/communications conduit being stored within an upper and a lower band storage chamber formed, respectively, within said upper and lower handset housing units when said upper and lower handset housing units are configured in said hand-held configuration;

said upper and lower handset housing units being positioned away from each other and connected by said resilient over-the-head combined support band/communications conduit, said resilient over-the-head combined support band/communications conduit being formed in a manner to resiliently assume a curved U-shape that is sufficient for use in supporting said upper and lower handset housing units on either side of a user's head and against a user's ears when said upper and lower handset housing units are configured in said head-set configuration;

said lower handset housing unit including an extendable microphone support structure, a fixed microphone opening, and a lower handset housing unit earpiece opening;

said upper handset housing unit including an upper handset housing unit top earpiece opening and an upper handset housing unit bottom earpiece opening.

2. The phone handset housing assembly of claim 1, wherein:

said upper handset housing circuit compartment and said upper band storage chamber are combined; and said lower handset housing circuit compartment and said lower band storage chamber are combined.

3. The phone handset housing assembly of claim 1, wherein:

an outwardly facing surface of said lower handset housing unit has a number of key apertures formed therethrough.

4. The phone handset housing assembly of claim 1 wherein:

said lower handset housing unit and said upper handset housing unit are each molded from plastic.

5. The phone handset housing assembly of claim 1 further including:

an upper handset housing unit cushion; and a lower handset housing unit cushion;

each said upper and lower handset housing unit cushion being formed from resilient foam rubber and having an adhesive backing;

said lower handset housing unit cushion having spaced fixed microphone access openings and a lower handset housing unit earpiece access opening;

said upper handset housing unit cushion having upper handset housing unit top and bottom earpiece access apertures.

6. The phone handset housing assembly of claim 1 wherein:

said resilient over-the-head combined support band/communications conduit includes a resilient outer shell that is constructed of resilient glass filled plastic and that covers a number of copper electrical connecting cables.

7. The phone handset housing assembly of claim 2, wherein:

an outwardly facing surface of said lower handset housing unit has a number of key apertures formed therethrough.

8. The phone handset housing assembly of claim 2 wherein:

said lower handset housing unit and said upper handset housing unit are each molded from plastic.

9. The phone handset housing assembly of claim 2 further including:

an upper handset housing unit cushion; and a lower handset housing unit cushion;

each said upper and lower handset housing unit cushion being formed from resilient foam rubber and having an adhesive backing;

said lower handset housing unit cushion having spaced fixed microphone access openings and a lower handset housing unit earpiece access opening;

said upper handset housing unit cushion having upper handset housing unit top and bottom earpiece access apertures.

10. The phone handset housing assembly of claim 2 wherein:

said resilient over-the-head combined support band/communications conduit includes a resilient outer shell that is constructed of resilient glass filled plastic and that covers a number of copper electrical connecting cables.

11. The phone handset housing assembly of claim 7 wherein:

said lower handset housing unit and said upper handset housing unit are each molded from plastic.

12. The phone handset housing assembly of claim 7 further including:

an upper handset housing unit cushion; and a lower handset housing unit cushion;

each said upper and lower handset housing unit cushion being formed from resilient foam rubber and having an adhesive backing;

said lower handset housing unit cushion having spaced fixed microphone access openings and a lower handset housing unit earpiece access opening;

said upper handset housing unit cushion having upper handset housing unit top and bottom earpiece access apertures.

13. The phone handset housing assembly of claim 7 wherein:

said resilient over-the-head combined support band/communications conduit includes a resilient outer shell that is constructed of resilient glass filled plastic and that covers a number of copper electrical connecting cables.

14. The phone handset housing assembly of claim 11 further including:

an upper handset housing unit cushion; and a lower handset housing unit cushion;

each said upper and lower handset housing unit cushion being formed from resilient foam rubber and having an adhesive backing;

said lower handset housing unit cushion having spaced fixed microphone access openings and a lower handset housing unit earpiece access opening;

said upper handset housing unit cushion having upper handset housing unit top and bottom earpiece access apertures.

15. The phone handset housing assembly of claim 11 wherein:

said resilient over-the-head combined support band/communications conduit includes a resilient outer shell that is constructed of resilient glass filled plastic and that covers a number of copper electrical connecting cables.

16. The phone handset housing assembly of claim 14 wherein:

said resilient over-the-head combined support band/communications conduit includes a resilient outer shell that is constructed of resilient glass filled plastic and that covers a number of copper electrical connecting cables.

17. The phone handset housing assembly of claim 8 further including:

an upper handset housing unit cushion; and a lower handset housing unit cushion;

each said upper and lower handset housing unit cushion being formed from resilient foam rubber and having an adhesive backing;

said lower handset housing unit cushion having spaced fixed microphone access openings and a lower handset housing unit earpiece access opening;

said upper handset housing unit cushion having upper handset housing unit top and bottom earpiece access apertures.

18. The phone handset housing assembly of claim 4 further including:

an upper handset housing unit cushion; and a lower handset housing unit cushion;

each said upper and lower handset housing unit cushion being formed from resilient foam rubber and having an adhesive backing;

said lower handset housing unit cushion having spaced fixed microphone access openings and a lower handset housing unit earpiece access opening;

said upper handset housing unit cushion having upper handset housing unit top and bottom earpiece access apertures.

19. The phone handset housing assembly of claim 4 wherein:

said resilient over-the-head combined support band/communications conduit includes a resilient outer shell that is constructed of resilient glass filled plastic and that covers a number of copper electrical connecting cables.

20. The phone handset housing assembly of claim 5 wherein:

said resilient over-the-head combined support band/ communications conduit includes a resilient outer shell that is constructed of resilient glass filled plastic and that covers a number of copper electrical connecting cables.

* * * * *